US007198262B2

(12) United States Patent
Hartl et al.

(10) Patent No.: US 7,198,262 B2
(45) Date of Patent: Apr. 3, 2007

(54) ENVELOPE-TURNING STATION

(75) Inventors: Wolfgang Hartl, Alsfed (DE); Eddy Edel, Friedberg (DE)

(73) Assignee: Pitney Bowes Deutschland GmbH, Heppenheim (DE)

( * ) Notice: Subject to any disclaimer, the term of this patent is extended or adjusted under 35 U.S.C. 154(b) by 91 days.

(21) Appl. No.: 11/046,294

(22) Filed: Jan. 28, 2005

(65) Prior Publication Data

US 2005/0167903 A1 Aug. 4, 2005

(30) Foreign Application Priority Data

Jan. 30, 2004 (DE) ...................... 10 2004 004 893

(51) Int. Cl.
*B65H 5/02* (2006.01)
*B65G 47/24* (2006.01)

(52) U.S. Cl. .......................... 271/2; 271/178; 271/187; 198/400; 198/409; 198/412

(58) Field of Classification Search ................ 198/400, 198/408, 409, 412; 271/2, 65–66, 178, 225, 271/184–187

See application file for complete search history.

(56) References Cited

U.S. PATENT DOCUMENTS

| | | | | |
|---|---|---|---|---|
| 4,307,800 A * | 12/1981 | Joa | ............................ | 198/374 |
| 4,542,818 A * | 9/1985 | Pavie | ...................... | 198/469.1 |
| 4,865,304 A | 9/1989 | ZvanderSyde et al. | | |
| 5,201,399 A * | 4/1993 | Dietrich | ...................... | 198/409 |
| 5,485,989 A * | 1/1996 | McCay et al. | ................. | 271/2 |
| 5,975,514 A | 11/1999 | Emigh et al. | | |
| 6,726,000 B2 * | 4/2004 | Reist et al. | ................. | 198/408 |

FOREIGN PATENT DOCUMENTS

| | | |
|---|---|---|
| DE | 1806631 A | 5/1970 |
| DE | 1956658 A | 4/1971 |

* cited by examiner

*Primary Examiner*—Mark A. Deuble
(74) *Attorney, Agent, or Firm*—Michael J. Cummings; Steven J. Shapiro; Angelo N. Chaclas

(57) ABSTRACT

In the case of an envelope-turning station with a turning cylinder which is oriented parallel to the mail-conveying direction and is equipped with openable and closable jaws on its circumference, it is possible, following charging of the turning-cylinder jaws with horizontally flat items of mail and rotation of the turning cylinder through 90° and/or 270°, for a mail removal arrangement to remove items of mail in the mail-conveying direction, in a state in which they are standing on one of their longitudinal edges, and to feed them to further processing or handling stations of a mail-processing installation.

5 Claims, 3 Drawing Sheets

ENVELOPE-TURNING STATION

FIELD OF THE INVENTION

The invention relates to mail-processing machines with a cyclically operated envelope-turning station which is arranged downstream of an envelope-filling station and of an envelope-closing section, as seen in the mail-conveying direction, and has a turning cylinder which is made to circulate in a correspondingly cyclic manner, of which the axis of rotation is oriented parallel to the mail-conveying direction and which bears, on its circumference, jaws which can be actuated into the open position and into the closed position irrespective of the rotary position of the envelope-turning cylinder and into which filled envelopes, forming the mail, can be conveyed by means of a gripper chain, in the case of the jaws opening horizontally, from the envelope-closing section and from which, following closure of the jaws and rotation of the envelope-turning cylinder, envelopes can be conveyed away again.

Such mail-processing machines, which have been commercially available for some time now, contain in the envelope-turning station, in which, following rotation of the turning cylinder through 180°, filled envelopes are conveyed away again with the address-panel side or envelope-window side oriented upwards, a turning-cylinder mechanism in the case of which, in the vicinity of the circumference of the turning cylinder, strip-like or blade-like jaw parts, which extend in an elongate manner in the direction of the axis of rotation of the turning cylinder or in the mail-conveying direction, are mounted about pivot pins parallel to the axis of rotation of the turning cylinder and are pivoted into the open position and into the closed position, counter to spring prestressing, by means of stationary guides, via links and contact rollers, during rotation of the turning cylinder. This mechanism is known in this field to the person skilled in the art and thus need not be discussed in detail in the present description or in the claims.

In certain cases involving mail processing, it may be desirable, following the insertion of the sets of enclosures into envelopes, for the filled envelopes which leave the envelope-filling station in a horizontally flat state to be conveyed further in a state in which they are standing vertically on edge and to be fed in this way to further processing stations, for example code readers, which respond to codemarks on one side of the envelope or the other, text-reading devices, which evaluate text on the front side and/or the rear side of the envelope, sorting devices, by means of which items of mail supplied in a state in which they are standing on edge are directed into certain compartments via diverters, and the like.

The object of the invention is for an envelope-turning station having the features of the preamble of the attached Patent claim 1 to be configured such that there is no need for a separate processing station for setting the items of mail into an upright position in which they are standing on one of the longitudinal edges, and the items of mail can be removed directly from the envelope-turning station in this position.

This object is achieved according to the invention in that the mail-removal arrangement or an additional mail-removal arrangement is arranged, and can be controlled, in relation to the turning cylinder such that, by means of this arrangement, items of mail which are fed between the open parts of the jaws of the turning cylinder by the mail-feeding arrangement, following closure of the jaws and rotation of the turning cylinder through 90° and/or 270° into a vertical position, are conveyed out from between the parts of the relevant jaw of the turning cylinder and conveyed away in a state in which they are standing on one of their longitudinal edges.

It can be seen that the envelope-turning station specified here on the one hand, can be used exclusively for setting the filled envelopes into a vertical position in which they are standing on the longitudinal edge or else can also be used, by the provision of a conventional mail-removal arrangement and corresponding control means for the respective drives, optionally either for setting the envelopes into an upright position in which they are standing on a longitudinal edge or for conveying away filled envelopes, following rotation of the envelope-turning cylinder through 180°, with an address-panel side or envelope-window side oriented upwards.

Finally, according to the developed embodiments, it is also possible for an envelope-turning station of the type specified here to be designed such that it optionally serves various mail-removal arrangements, of which one conveys away from the turning cylinder, following rotation of the latter through 90°, items of mail which are supplied in a state in which they are standing on the envelope-flap edge, of which the second removes from the turning cylinder items of mail which are turned in a conventional manner through 180°, and of which the third removes from the turning cylinder, and conveys further, items of mail which, following rotation of the turning cylinder through 270°, are retained on the turning cylinder in a downwardly oriented manner.

Moreover, advantageous configurations, improvements and developments of the envelope-turning station proposed here form the subject matter of the claims following claim 1, and, without the wording thereof being repeated here, the contents of these claims hereby expressly form a constituent part of the description.

BRIEF DESCRIPTION OF THE DRAWINGS

Various exemplary embodiments are explained in more detail herein below with reference to the drawings, in which.

Figure 1:
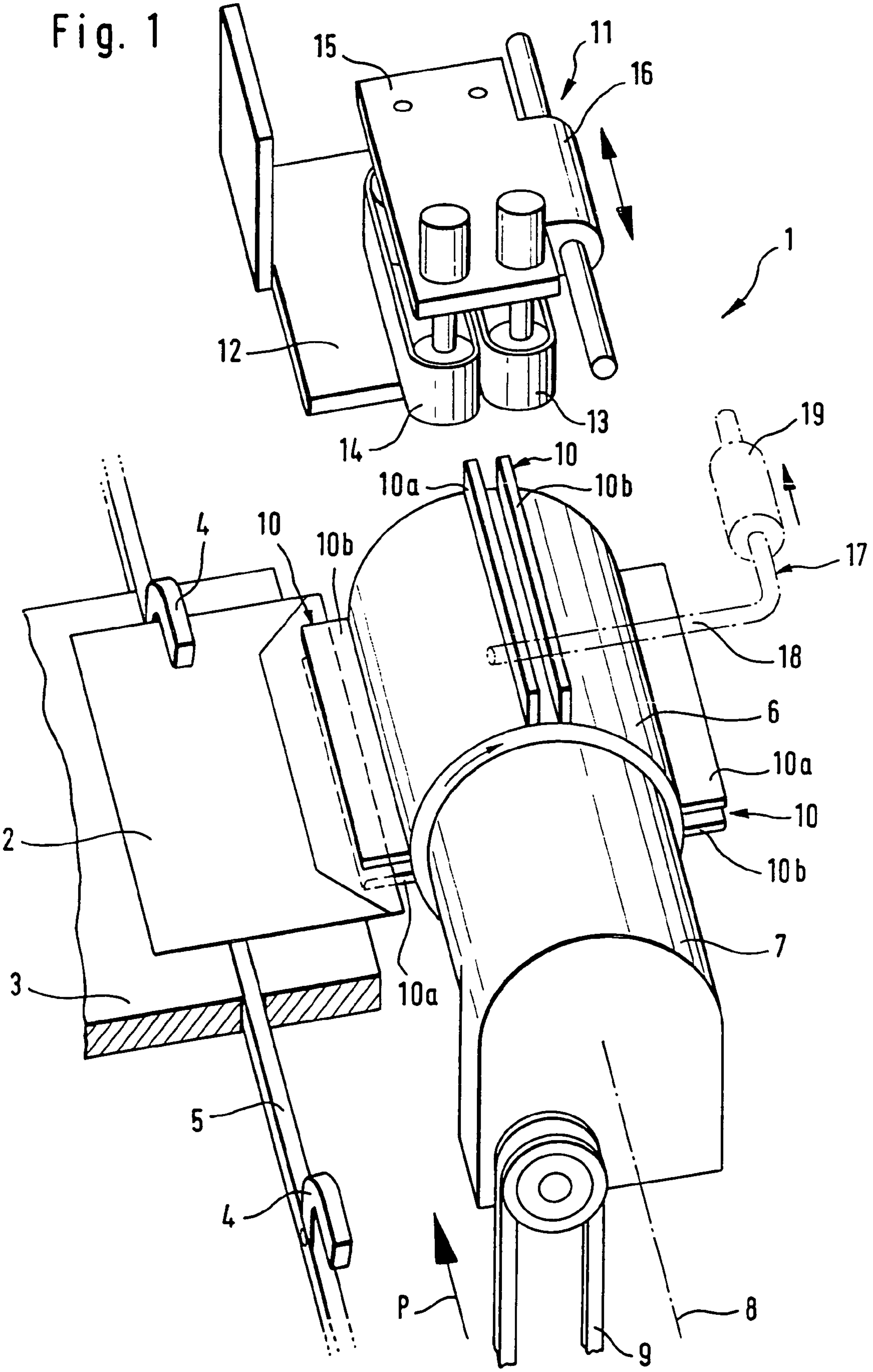
FIG. 1 shows schematic, perspective view, as seen essentially obliquely from above in the mail-conveying direction, of a first embodiment of an envelope-turning station of the type proposed here.
Figure 2:
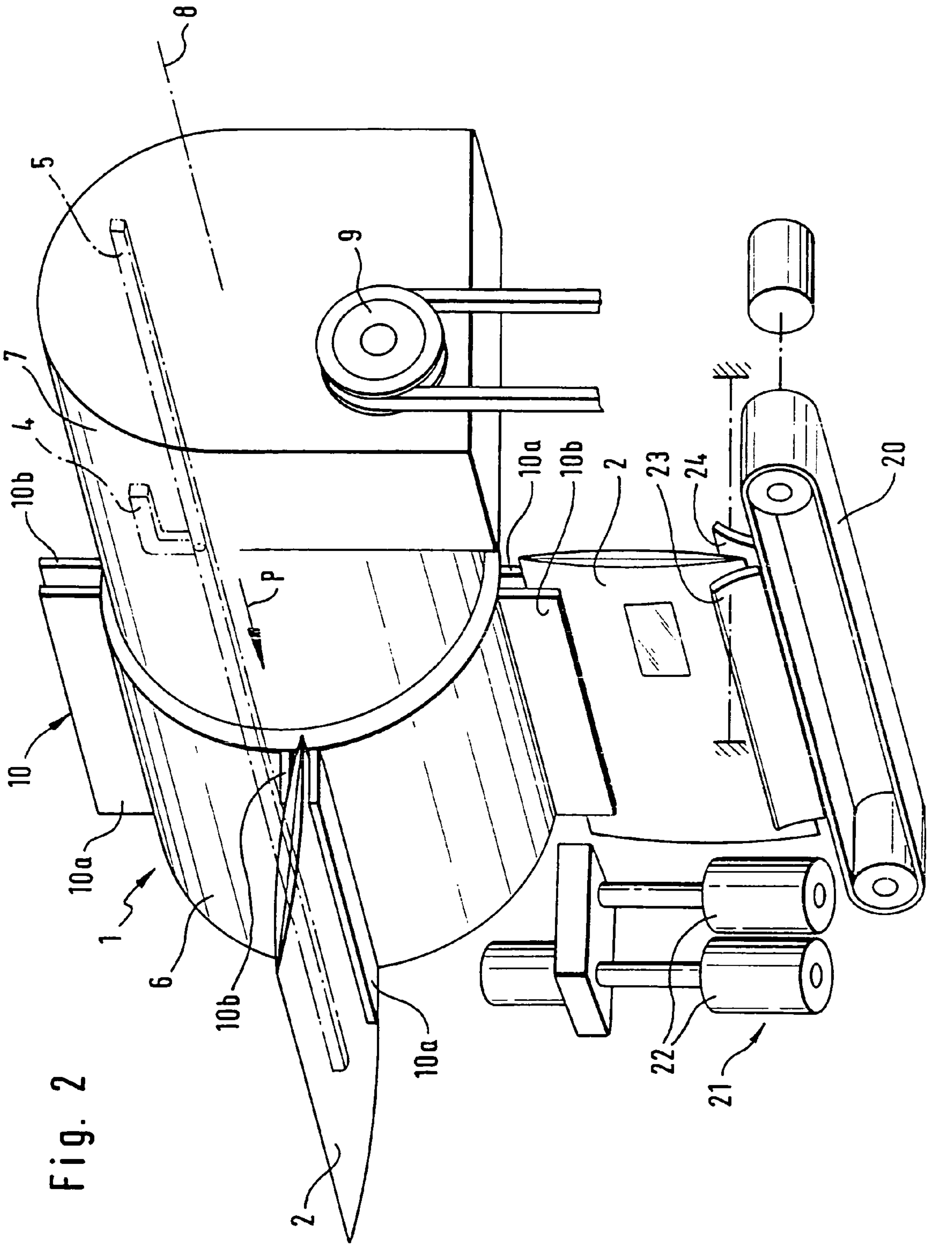
FIG. 2 shows schematic, perspective view, as seen obliquely from below essentially approximately in the mail-conveying direction, of a second embodiment of the envelope-turning station specified here.
Figure 3:
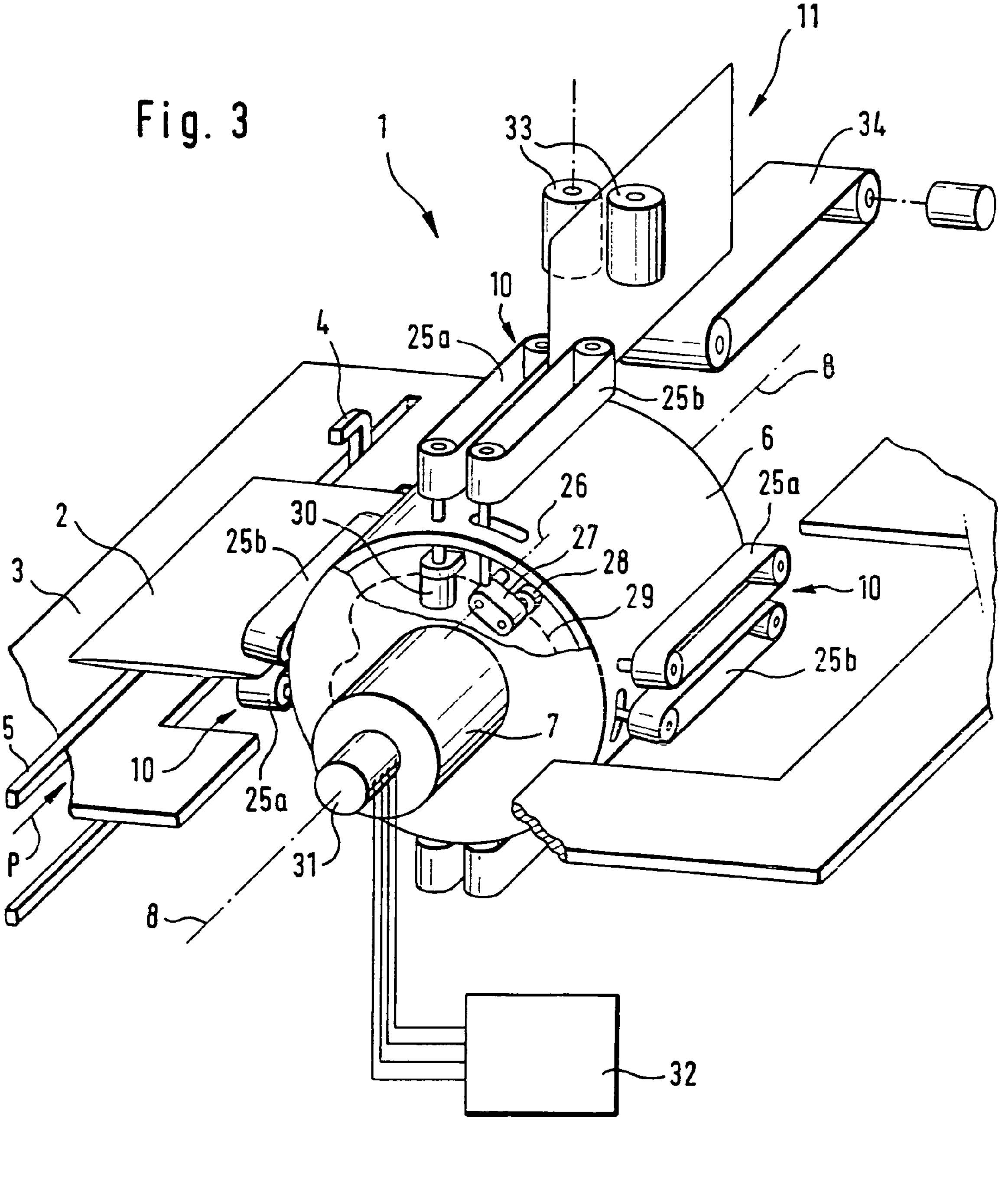
FIG. 3 shows a schematic, perspective view of another embodiment of an envelope-turning station of the type proposed here.

In general terms, it should be said in advance of a detailed description of the embodiments that the latter are not to be regarded in isolation; rather, the features of these embodiments may also be combined with one another such that, for example, the embodiments according to FIGS. 1 and 2 can be combined to form a single embodiment or certain features of the embodiments according to FIGS. 1 to 3 can be interchanged between the individual embodiments, this being discussed in more detail on an individual basis herein below.

FIG. 1 shows an envelope-turning station 1 which, within a mail-processing installation, is arranged downstream of an envelope-filling station and of an envelope-closing section, as seen in the mail-conveying direction, which is indicated by the arrow P. In a manner which is known to the person skilled in the art, filled envelopes 2 are drawn into the envelope-turning station 1 in a horizontally flat position on the surface of an envelope-filling bench 3 by means of grippers 4 of an endless, circulating, intermittently driven gripper chain 5, in the manner illustrated, following departure from the closing section (not shown in the drawing).

The envelope-turning station contains an envelope-turning cylinder 6 which is constructed in a manner which is essentially known per se and which can be made to rotate about the axis of rotation 8 of the turning cylinder, by means of a turning-cylinder drive 7, in certain rotary steps in the clockwise direction, as seen in relation to the illustration according to the figures of the drawing. In specific terms, for this purpose, the turning-cylinder drive 7 contains a coupling which is connected between a drive shaft of the turning cylinder 6 and a driving chain drive 9, can be actuated by control signals of a control device and makes it possible, during continuous driving operation of the chain drive 9, for the turning-cylinder drive 7 to produce the desired rotary steps of the turning cylinder 6 by controlled engagement and controlled disengagement of the coupling.

The turning cylinder 6 bears, on its circumference, strip-like jaws 10 which can be pivoted essentially in the circumferential direction, about pivot pins oriented parallel to the axis of rotation 8 of the turning cylinder, into the open position and into the closed position by means of a pivoting-drive mechanism, which extend in an elongate manner in the mail-conveying direction, which project essentially radically away from the lateral surface of the turning cylinder and which have mutually opposite jaw parts 10*a* and 10*b*. In the case of the exemplary embodiments shown, the turning cylinder 6 is provided with four jaws 10 which are distributed uniformly over the turning-cylinder circumference and are spaced apart from one another by an angular distance of 90°. As the modification to this, however, it is also possible for a smaller or larger number of jaws 10 to be distributed over the turning-cylinder circumference.

The pivoting-drive mechanism for the jaws 10 may contain a guide arrangement which is stationary relative to the envelope-turning cylinder 6 and, during rotation of the turning cylinder 6, is followed by contact rollers coupled to the parts of the jaws 10, with the result that the turning-cylinder jaws 10, in certain rotary positions of the turning cylinder 6, are moved into the open position and, during rotation of the turning cylinder 6 between certain rotary positions, are retained in the closed position. This mode of operation is known to the person skilled in the art from turning cylinders of conventional envelope-turning stations.

It should be stated, however, that the pivoting-drive mechanism, for actuating the jaws 10 of the turning cylinder 6, is designed either such that it pivots just one jaw part 10*a* or 10*b* into the open position or into the closed position, while the respectively other jaw part 10*b* or 10*a* is fixed relative to the turning cylinder 6 or else such that both jaw parts 10*a* and 10*b* are designed in a pivotable manner relative to the turning cylinder 6 and are moved towards one another into the closed position, or away from one another into the open position, by a correspondingly designed pivoting-drive mechanism.

As can be seen from FIG. 1, the gripper chain 5 conveys a filled envelope 2 between the open parts 10*a* and 10*b* of that jaw 10 of the turning cylinder 6 which is located, in the horizontal position, approximately in the plane of the top side of the envelope-filling bench 3, the opening region of the jaw 10 being positioned essentially above the top side of the envelope-filling bench 6, with the result that the filled envelope 2 can readily be conveyed in.

If, then, the gripper chain 5 is brought to a 10 standstill and the gripper 4, which retains the filled envelope or item of mail 4 is opened, the gripper 4 can be drawn off from the item of mail by virtue of the gripper chain 5 being set in operation again. Along with this, or shortly beforehand, by actuation of the controllable coupling of the turning-cylinder drive 7, the turning cylinder 6 is coupled to the continuously acting chain drive 9 and rotation of the turning cylinder 6 is initiated, this resulting in the pivoting-drive mechanism for the jaws 10 moving the latter, if they are located in the open position, into the closed position. The horizontally positioned jaw 10 which is oriented to the left in FIG. 1 thus grips the item of mail and carries it along upwards as the turning cylinder 6 rotates further in the clockwise direction, with the result that, following turning-cylinder rotation through 90°, the item of mail is retained in a vertically upwardly oriented manner between the jaw parts 10*a* and 10*b* in a state in which it is standing on its longitudinal border adjacent to the envelope flap. In this position, the turning cylinder 6 is brought to a standstill by virtue of the controllable coupling of the turning-cylinder drive 7 being disengaged, and the jaw parts 10*a* and 10*b* are moved into the open position, with the result that, by means of a mail-removal arrangement 11, the item of mail standing on one of its longitudinal edges can be drawn out parallel to the mail-conveying direction, corresponding to the arrow P, from between the parts of the vertically upwardly oriented jaw 10 and set down on the base of a further-conveying channel 12.

If, in certain cases, the mail-removal arrangement 115 is not to remove the item of mail standing on edge, then the turning cylinder 6 is made to rotate anew, as a result of which the parts 10*a* and 10*b* of the vertically upwardly oriented jaw 10 close again, grip the item of mail anew and then turn it into that position in which the item of mail, for example the filled envelope, is positioned flatly once again with the envelope flap oriented downwards, and with an address side or envelope-window side oriented upwards, and, following opening of the jaw 10 which is oriented to the right as seen in relation to the illustration of FIG. 1, can be conveyed away from between the parts of this jaw in the mail-conveying direction, corresponding to arrow P, by a further mail-removal arrangement, which is not shown in FIG. 1.

Corresponding configuration of the pivoting-drive mechanism for the jaws 10 of the turning cylinder 6, that is to say, for example, corresponding profiling of a stationary guide arrangement which can be followed by contact rollers of the pivotable jaw parts, makes it possible to achieve a situation where, as soon as they are positioned vertically, the opening of the jaws 10 is smaller than when they are positioned horizontally, in order that an item of mail which is conveyed upwards, and moved into the vertical position, by rotation of the turning cylinder 6 through 90° does not tilt over, thus preventing correct gripping by the mail-removal arrangement 11, when the jaws open in this position.

It can be seen from FIG. 1 that the mail-removal arrangement 11 is located in a standby position outside a hollow-cylindrical annular space through which an item of mail 2 which is to be handled passes during rotation of the turning cylinder 6. If an item of mail 2 has been positioned to project vertically upwards out of the turning cylinder 6, and if it is to be drawn out by means of the envelope-removal arrangement 11 from between the at least partially open parts of the jaw 10, then the envelope-removal arrangement 11 is advanced counter to the mail-conveying direction, corresponding to arrow P, towards the adjacent end border or the transverse edge of the item of mail 2 and grips this border in a conveying nip between endlessly circulating conveying belts 13 and 14 which are oriented parallel to the mail-conveying direction P and are guided over rollers with vertical axes of rotation. The mounting of the conveying belts 13 and 14 is supported on a carriage 15, which is retained such that it can be displaced in relation to a framework via a slide-action guide 16.

FIG. 1 also shows a modification of the envelope-removal arrangement in highly schematic form, using chain-dotted lines. According to this modification, the conveying belts 13 and 14 may be retained in a fixed manner on the framework of the turning station, but are located outside the abovementioned hollow-cylindrical space through which the items of mail 2 pass during rotation of the turning cylinder 6. In addition, a pushing-out mechanism 17 with a pushing-out pin 18 and a pushing-out drive 19 is located outside this hollow-cylindrical path. As soon as an item of mail 2 has come to a standstill in a state in which it projects vertically upwards out of the turning cylinder, and the relevant jaw 10 of the turning cylinder has been opened, the pushing-out pin 18 of the pushing-out mechanism 17 pushes the item of mail, by exerting pressure against the rear transverse edge of the same, between the driven conveying belts 13 and 14 and then returns into its starting position again.

While in the embodiment according to FIG. 1 the filled envelopes 2 or items of mail which are conveyed up in the flat state by the gripper chain 5, following rotation of the turning cylinder 6 through 90°, are gripped, and fed to the further-conveying region 12, by the mail-removal arrangement 11 in a state in which they are standing on their longitudinal edge adjacent to the envelope flap, the embodiment according to FIG. 2 achieves the situation where the filled envelopes 2 conveyed up in the flat state leave the envelope-turning station of the type specified here in a state in which they are standing on their longitudinal edge which is located opposite the envelope flap.

The design of the envelope-turning station 1 according to FIG. 2, in respect of the design of the envelope-filling bench 3 (not shown in this drawing), in respect of the design of the intermittently driven gripper chain 5 and of the openable and closable grippers 4 which are arranged thereon and are intended for transporting the items of mail 2, and in respect of the operations in which the items of mail 2 conveyed up by the gripper chain are received by the horizontally positioned jaws 10 which are oriented to the left as seen in relation to the illustration of FIG. 2, is exactly the same as the embodiment according to FIG. 1, so there is no need for these details to be described again.

In the case of the embodiment according to FIG. 2, once it has been received between the jaw parts 10*a* and 10*b* in the horizontal position of the latter and once the relevant jaw 10 has been closed, an item of mail 2 is carried along by the turning cylinder as it rotates via 270°, and then passes into the vertically downwardly hanging position which is shown in FIG. 2. As soon as this position has been reached, the turning cylinder 6 is brought to a standstill. If the parts 10*a* and 10*b* of the downwardly oriented jaw 10 are then opened by virtue of the turning cylinder being rotated further, the item of mail 2 drops out of the downwardly oriented jaw with its longitudinal edge which is located opposite the envelope flap standing on an endless, circulating conveying belt 20 which extends parallel to the mail-conveying direction P and belongs to a mail-removal arrangement 21, which also contains a driven pair of rollers 22 which are arranged in the vicinity of the discharge region of the conveying belt 20, of which the drive spindles are oriented vertically and which form between them a conveying nip which is positioned in the plane of the item of mail 2 hanging vertically downwards away from the turning cylinder 6. The pair of rollers 22 of the mail-removal arrangement 21, like the drive for the pair of rollers, is located outside a hollow-cylindrical space through which an item of mail 2 clamped in the jaws 10 of the turning cylinder 6 passes during rotation of the latter. As soon as a vertically downwardly oriented item of mail 2 which is retained by the turning cylinder 6, between the jaw parts 10*a* and 10*b*, is released by the relevant jaw, it can be conveyed by the conveying belt 20 into the conveying nip of the pair of rollers 22 and conveyed out in its entirety from between the open jaw parts 10*a* and 10*b*, parallel to the mail-conveying direction P. and conveyed away.

Directing plates 23 and 24 are secured on the framework 30 of the installation part and form a longitudinally running cross-sectionally funnel-like directing channel for the bottom longitudinal edge of the item of mail 2 in the direction of the top side of the top strand of the conveying belt 20. The directing plates 23 and 24 have their top horizontal edges located outside the already mentioned hollow-cylindrical space through which the items of mail 2 pass during rotation of the turning cylinder. The directing plates 23 and 24 prevent the items of mail 2 from tilting or skewing as they are fed on the conveying belt 20 to the pair of rollers 22.

It can be seen that an envelope-turning station 5 according to FIG. 1, in addition to the envelope—removal arrangement 11, may also have an envelope-removal arrangement 21 according to FIG. 2, in which case the operations of rotating the turning cylinder 6 and of opening and closing the jaws 10 in certain rotary positions of the turning cylinder are controlled such that optionally filled envelopes, in a state in which they are standing on edge, can be removed, from the turning station designed in such a manner, with the longitudinal edge which is adjacent to the envelope flap oriented downwards, this being done by the envelope-removal arrangement 11, and with the longitudinal edge which is adjacent to the envelope flap oriented upwards, this being done by means of the mail-removal arrangement 21 according to FIG. 2. Moreover, the arrangement may be such that, as has already been indicated in conjunction with the description of FIG. 1, it is also possible for optionally turned filled envelopes to be removed in the horizontally flat position with the envelope-window side or the address side oriented upwards.

The embodiment according to FIG. 3 differs from that according to FIG. 1 predominantly by way of the design of the jaws of the turning cylinder 6, these jaws also being designated 10 in FIG. 3. The rest of the parts of the envelope-turning station according to FIG. 3 largely correspond, in terms of construction and operation, to the corresponding parts of the embodiment according to FIGS. 1 and 2, so that a detailed description in this respect can be dispensed with here. In any case, the same designations are also used in each case for such corresponding parts.

In the case of the embodiment according to FIG. 3, the jaws 10 of the turning cylinder 6 are in the form of pairs of conveying belts 25*a*, 25*b* which extend in an elongate manner in the mail-conveying direction and of which the conveying belts 25*a* are guided over rollers of which the running spindles or drive shafts are oriented and positioned in a fixed manner relative to the lateral surface of the turning cylinder 6, whereas the conveying belts 25*b* are guided over rollers of which the running spindles are fastened in each case on a pivot pin 26 which is oriented parallel to the axis of rotation 8 of the turning cylinder and relative to which they have a radial orientation, which corresponds only approximately with a radial orientation in relation to the axis of rotation 8 of the turning cylinder.

The pivot pin 26 for the rollers of the conveying belts 25*b*, it being possible for said rollers to be pivoted relative to the turning cylinder 6, can be pivoted by means of a link 27, of a contact-roller arrangement 28 and of a guide arrangement 29 (indicated schematically and by chain-dotted lines in FIG. 3) such that the conveying belts 25*b* can be pivoted relative to the conveying belts 25*a* of the same pair of conveying belts in each case, depending on the rotary position of the turning cylinder 6, into an open position and into a closed position, that is to say in a corresponding manner to that described for the jaw parts 10*a* and 10*b* of the embodiment according to FIG. 1.

In the case of the embodiment which is shown in FIG. 3, the drive shafts of those rollers of the conveying belts 25*a* which are located close to the observer are each coupled to drive motors 30 which are mounted within the turning cylinder 6, and circulate therewith, and of which the power supply lines and control lines are connected to a control device 32 via a slipring arrangement 31, which is indicated merely purely schematically in FIG. 3. The control device 32 supplies power to the drive motors 30 via the slipring arrangement 31 whenever an item of mail 2 which has been turned or set into an upright position by the turning cylinder 6 following a certain rotary step, and is retained between the conveying belts 25*a* and 25*b* in a state in which it is standing on edge, is to be conveyed out from between these conveying belts and conveyed further in the mail-conveying direction, corresponding to the arrow P. by parts of a mail-removal arrangement.

It can be seen that, in the case of such an arrangement, the items of mail 2 can be removed from the jaws 10, in the form of the pairs of conveying belts, without provision being made for the jaws to be opened in this position. This results in the advantage that the item of mail, which is to be removed is still reliably retained, during the removal phase, in the state in which it is standing on edge.

A further advantage of designing the jaws 10 as pairs of conveying belts is that, in this case, the jaws, at the same time, form part of the mail-removal arrangement, by means of which the respective item of mail is pushed out of the hollow-cylindrical region through which it passes around the turning cylinder until it can be gripped by a pair of rollers 33, with vertical roller axes, and a conveying belt 34 which runs parallel to the mail-conveying direction P and has horizontal roller axes. The mail-removal arrangement 11 according to FIG. 3 corresponds approximately, in terms of design, to the mail-removal arrangement 21 according to FIG. 2, but is located, in its entirety, at an axial distance away from the region of the turning cylinder 6, as seen in the mail-conveying direction.

The person skilled in the art can see that, as a modification to the embodiment according to FIG. 3, it is possible for the rollers of both the conveying belts 25*a* and of the conveying belts 25*b* to be driven, and that, furthermore, the arrangement may be such that the conveying belts 25*a* and 25*b*, which act as jaw parts, move symmetrically to an axial longitudinal center plane of a jaw system as they move in the opening direction or closing direction.

Finally, it should also be noted that, in order to simplify the illustration in the figures of the drawings, connections to the framework of the turning station which are obvious to the person skilled in the art have been left out, and prestressing means for the spring prestressing, for example, of the jaw parts in the direction towards one another or away from one another, as details which are familiar to the person skilled in the art, have not been depicted.

What is claimed is:

1. Envelope-turning station for mail-processing installations comprising:

an envelope-turning cylinder of which an axis of rotation is oriented parallel to a mail conveying direction which rotates cyclically in rotary steps by means of a drive actuable in a controlled manner, and which bears, on its circumference jaws which can be pivoted into an open position and into a closed position, end which extend in the mail-conveying direction;

a mail-feeding arrangement which conveys items of mail via a horizontal envelope-filling bench between open jaws of the turning cylinder when the jaws are located essentially in the plane of the envelope-filling bench; and a mail-removal arrangement by means of which, following closure of the jaws and rotation of the turning cylinder into a new rotary position, items of mail are conveyed out from between the jaws and conveyed away in a turned state;

wherein the mail-removal arrangement is arranged, and can be controlled, in relation to the turning cylinder such that, after rotation of the turning cylinder through 90° and/or 270° into a vertical position, items of mail within the jaws are conveyed out from the jaws and conveyed away in a state in which they are standing on one of their longitudinal edges; and wherein the mail-removal arrangement has driven pairs of rollers with a vertical axis of rotation, it being the case that the pairs of rollers are mounted on a carriage which can be displaced parallel to the mail-conveying direction and can be actuated by means of a drive such that, during rotation of the turning cylinder the pairs of rollers are located outside the space through which the hems of mail pass and, once the turning cylinder has been brought to a standstill and the carriage is displaced counter to the mail-conveying direction a vertically positioned item of mail is gripped by the pair of rollers and drawn out in the horizontal direction from between the jaws of the turning cylinder.

2. Envelope-turning station for mail-processing installations comprising:

an envelope-turning cylinder of which an axis of rotation is oriented parallel to a mail conveying direction which rotates cyclically in rotary steps by means of a drive actuable in a controlled manner, and which bears, on its circumference jaws which can be pivoted into an open position and into a closed position, and which extend in the mail-conveying direction;

a mail-feeding arrangement which conveys items of mail via a horizontal envelope-filling bench between open jaws of the turning cylinder when the jaws are located essentially in the plane of the envelope-filling bench;

a mail-removal arrangement by means of which, following closure of the jaws and rotation of the turning cylinder into a new rotary position, items of mail are conveyed out from between the jaws and conveyed away in a turned state;

wherein the mail-removal arrangement is arranged, and can be controlled, in relation to the turning cylinder such that, after rotation of the turning cylinder through 90° and/or 270° into a vertical position, items of mail within the jaws are conveyed out from the jaws and conveyed away in a state in which they are standing on one of their longitudinal edge; and wherein the mail-removal arrangement has pairs of belts which are guided over driven rollers with a vertical axis of rotation and have the belts running horizontally, it being the case that the pairs of belts are mounted on a carriage which can be displaced parallel to the mail-conveying direction and can be actuated by means of a drive such that, during rotation of the turning cylinder the pairs of belts are located outside the space through which the items of mail pass and, once the turning cylinder has been brought to a standstill and the carriage is displaced counter to the mail-conveying direction a vertically positioned hem of mail is gripped by the pair of belts and drawn out in the horizontal direction from between the jaws of the turning cylinder.

3. Envelope-turning station for mail-processing installations comprising:

an envelope-turning cylinder of which an axis of rotation is oriented parallel to a mail-conveying direction which rotates cyclically in rotary steps by means of a drive actuable in a controlled manner, and which bears, circumference jaws which can be pivoted into an open position and into a closed position, and which extend in the mail-conveying direction;

a mail-feeding arrangement which conveys items of mail via a horizontal envelope-filling bench between open jaws of the turning cylinder when the jaws are located essentially in the plane of the envelope-filling bench; and a mail-removal arrangement by means of which, following closure of the jaws and rotation of the turning cylinder into a new rotary position, items of mail are conveyed out from between the jaws and conveyed away in a turned state;

wherein the mail-removal arrangement is arranged, and can be controlled, in relation to the turning cylinder such that, after rotation of the turning cylinder through 90° and/or 270° into a vertical position, items of mail within the jaws are conveyed out from the jaws and conveyed away in a state in which they are standing on one of their longitudinal edges; and wherein the mail-removal arrangement contains a pushing-out arrangement which, at least in a standby position, is located outside the space through which the items of mail pass during rotation of the turning cylinder, and by means of which, once the turning cylinder has been brought to a standstill, a vertically positioned item of mail is pushed out from between the jaws of the turning cylinder and to be conveyed further.

4. Envelope-turning station according to claim 3, wherein the pushing-out arrangement is in the form of an endless conveying belt which runs horizontally in the mail-conveying direction, and is positioned over driven rollers with a horizontal axis of rotation and is located outside the space through which the items of mail pass during rotation of the turning cylinder and beneath that region which the jaws of the turning cylinder occupy following filling with an item of mail and rotation of the turning cylinder through 270°.

5. Envelope-turning station for mail-processing installations comprising:

an envelope-turning cylinder of which an axis of rotation is oriented parallel to a mail-conveying direction which rotates cyclically in rotary steps by means of a drive actuable in a controlled manner, and which bears, on its circumference jaws which can be pivoted into an open position and into a closed position, and which extend in the mail-conveying direction;

a mail-feeding arrangement which conveys items of mail via a horizontal envelope-filling bench between open jaws of the turning cylinder when the jaws are located essentially in the plane of the envelope-filling bench; and a mail-removal arrangement by means of which, following closure of the jaws and rotation of the turning cylinder into a new rotary position items of mail are conveyed out from between the jaws and conveyed away in a turned state;

wherein the mail-removal arrangement is arranged, and can be controlled, in relation to the turning cylinder such that, after rotation of the turning cylinder through 90° and/or 270° into a vertical position, items of mail within the jaws are conveyed out from the jaws and conveyed away in a state in which the are standing on one of their longitudinal edges;

wherein the jaws of the turning cylinder which extend in an elongate manner in the mail-conveying direction are formed by endless belts which are located opposite one another in a circumferential direction of the turning cylinder can be pivoted towards one another into the closed position, and away from one another into the open position, are guided over rollers which can be driven in a controlled manner, and can be made to circulate in a controlled manner in order for the items of mail to be passed on to the mail-removal arrangement; and wherein the belts forming the turning-cylinder jaws are retained by spring prestressing in the closed jaw position and are pivoted into the open position by guide actuation, acting on the axes of rotation of the rollers, in certain rotary positions of the turning cylinder in particular in the horizontal position, for charging with items of mail.

* * * * *